United States Patent
Wang et al.

(10) Patent No.: US 11,228,946 B2
(45) Date of Patent: Jan. 18, 2022

(54) COMMUNICATION METHOD AND DEVICE

(71) Applicant: CHINA ACADEMY OF TELECOMMUNICATIONS TECHNOLOGY, Beijing (CN)

(72) Inventors: Yingmin Wang, Beijing (CN); Jinbo Zhao, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 31 days.

(21) Appl. No.: 16/607,335

(22) PCT Filed: Apr. 20, 2018

(86) PCT No.: PCT/CN2018/083939
§ 371 (c)(1),
(2) Date: Oct. 22, 2019

(87) PCT Pub. No.: WO2018/196696
PCT Pub. Date: Nov. 1, 2018

(65) Prior Publication Data
US 2020/0068447 A1   Feb. 27, 2020

(30) Foreign Application Priority Data
Apr. 25, 2017  (CN) .......................... 201710275542.3

(51) Int. Cl.
*H04W 28/24* (2009.01)
*H04W 76/12* (2018.01)
(Continued)

(52) U.S. Cl.
CPC ........... *H04W 28/24* (2013.01); *H04L 1/1657* (2013.01); *H04L 47/805* (2013.01);
(Continued)

(58) Field of Classification Search
CPC ............. H04L 41/0893; H04L 41/5041; H04L 43/0876; H04L 43/0894; H04L 12/4625;
(Continued)

(56) References Cited

U.S. PATENT DOCUMENTS

2004/0082383 A1    4/2004  Muncaster et al.
2004/0228278 A1*  11/2004  Bruckman .............. H04L 47/10
                                                                        370/231
(Continued)

FOREIGN PATENT DOCUMENTS

CN       102790803 A     11/2012
CN       102905319 A      1/2013
(Continued)

OTHER PUBLICATIONS

European Patent Office, Munich Germany, Date: Feb. 17, 2020, PCT/CN2018083939, Applicant: China Academy of Telecommunications Technology, Communication, Extended European Search Report, EP 18 79 0486.
(Continued)

*Primary Examiner* — Phuc H Tran
(74) *Attorney, Agent, or Firm* — Harness, Dickey & Pierce, P.L.C.

(57) ABSTRACT

A communication method and a communication device are provided. The method includes: establishing a scenario and determining a task of the scenario, where a plurality of communication systems exist in the scenario, and the task is completed via at least one communication service; selecting at least one communication system for the task from the plurality of communication systems; and controlling the at least one communication system to transmit the communication service required by the task.

16 Claims, 5 Drawing Sheets

(51) Int. Cl.
*H04L 1/16* (2006.01)
*H04L 12/927* (2013.01)
*H04L 12/911* (2013.01)
*H04W 48/18* (2009.01)

(52) U.S. Cl.
CPC .......... *H04L 47/824* (2013.01); *H04W 48/18* (2013.01); *H04W 76/12* (2018.02)

(58) Field of Classification Search
CPC ............... H04L 1/1657; H04L 41/5051; H04L 41/5077; H04L 47/805; H04L 47/824; H04W 28/06; H04W 28/065; H04W 28/22; H04W 48/18; H04W 28/24; H04W 76/12; A63F 13/12; A63F 13/332; A63F 13/34; A63F 2300/402; A63F 2300/406; A63F 2300/807
See application file for complete search history.

(56) References Cited

U.S. PATENT DOCUMENTS

| | | | | |
|---|---|---|---|---|
| 2013/0286941 | A1* | 10/2013 | Lee | H04W 48/18 370/328 |
| 2018/0220373 | A1* | 8/2018 | Arzelier | H04W 28/0268 |
| 2020/0068447 | A1 | 2/2020 | Wang et al. | |

FOREIGN PATENT DOCUMENTS

| | | |
|---|---|---|
| CN | 103582159 A | 2/2014 |
| CN | 103731938 A | 4/2014 |
| CN | 105228133 A | 1/2016 |
| CN | 105611592 A | 5/2016 |
| CN | 105898544 A | 8/2016 |
| CN | 106411662 A | 2/2017 |
| CN | 106452989 A | 2/2017 |
| CN | 106559840 A | 4/2017 |
| CN | 107104908 A | 8/2017 |
| EP | 3062563 A1 | 8/2016 |

OTHER PUBLICATIONS

Patent Cooperation Treaty, Advancce E-Mail, PCT, Notification of Transmittal of Translation of the International Preliminary Report on Patentability, dated Nov. 7, 2019, PCT/CN2019/083939, Applicant: China Academy of Telecommunications Technology.

Text of the Notification of the First Office Action, Application No. 2017102755423, This application relates to a communication method and device.

The State Intellectual Property Office of People's Republic of China, Applicant: China Academy of Telecommunications Technology, Title of Invention: Communication Method and Apparatus Thereof, The Second Office Action, Examiner Code: 566935.

* cited by examiner

COMMUNICATION METHOD AND DEVICE

CROSS-REFERENCE TO RELATED APPLICATION

The present application is the U.S. national phase of PCT Application PCT/CN2018/083939 filed on Apr. 20, 2018, which claims a priority of the Chinese patent application No. 201710275542.3 filed on Apr. 25, 2017, which is incorporated herein by reference in its entirety.

TECHNICAL FIELD

The present disclosure relates to the field of communication technology, and in particular, to a communication method and a communication device.

BACKGROUND

At present, there are many kinds of communication systems, all of which were originally designed for a certain class of users and needs, wherein specific frequency bands and communication technologies are adopted to ensure the quality of communication. In addition, a system bandwidth of the communication system is also limited. In order to ensure the flexibility in resource scheduling, the communication system in the related art needs to allocate resources independently for a plurality of services supported in a network, and each service uses a fixed communication system for data transmission. Once the system load is high, the interference is large, which will seriously affect the communication quality, and even lead to poor communication reliability. It can therefore be seen that there are currently problems of low communication quality and poor communication reliability.

SUMMARY

The present disclosure is to provide a communication method and a communication device to solve the technical issue of low communication quality and poor communication reliability.

In order to achieve the above object, a communication method is provided, including:

establishing a scenario and determining a task of the scenario, where a plurality of communication systems exist in the scenario, and the task is completed via at least one communication service;

selecting at least one communication system for the task from the plurality of communication systems; and controlling the at least one communication system to transmit the communication service required by the task.

Optionally, the establishing the scenario and determining the task of the scenario includes:

establishing the scenario by using attribute information and scenario information acquired, determining the task of the scenario, and configuring a scenario tag for a communication device and/or a user account in the scenario, where the attribute information includes attribute information of the communication device and/or attribute information of a communication network, and the scenario information includes at least one of resource information, environmental information and user account information of the communication system.

Optionally, the selecting at least one communication system for the task from the plurality of communication systems includes:

selecting at least one communication system for the task from the plurality of communication systems based on a requirement of the task, scenario information of the scenario and a pre-specified resource allocation policy, and determining configuration information of a bearer to be established by each of the communication systems of the at least one communication system, where the configuration information includes at least one of a service quality, a security parameter and a channel resource parameter.

Optionally, the controlling the at least one communication system to transmit the communication service required by the task includes:

controlling, based on the configuration information of the bearer to be established by the at least one communication system, the at least one communication system to establish the bearer, to transmit via the bearer the communication service required by the task.

Optionally, the at least one communication system meets part or all of service quality requirements of the communication service.

Optionally, the controlling the at least one communication system to establish the bearer includes:

transmitting a bearer resource configuration message to the at least one communication system, and establishing the bearer by the at least one communication system based on the bearer resource configuration message; or transmitting a bearer establishment message to the at least one communication system, and autonomously determining resource configuration parameters and establishing the bearer by the at least one communication system.

Optionally, the task includes a communication task, a command task, or a control task; and a plurality of communication systems are selected for part or all of the communication services of the at least one communication service, and the communication services corresponding to the plurality of communication systems are transmitted by a plurality of communication systems cooperatively.

Optionally, the communication system selected for each communication service does not include a communication system that initiates the each communication service; or the communication system selected for each communication service includes a communication system that initiates the each communication service and at least one communication system other than the communication system that initiates the each communication service.

Optionally, a transmitting end of each communication service segments generated data to obtain data packets to be transmitted in one or more communication systems corresponding to the each communication service, the transmitting end numbers the data packets, and then the numbered data packets are transmitted via one or more communication systems corresponding to the each communication service, where the segmented data includes encoded data or uncoded data.

Optionally, the method further includes:

if the communication quality meets a preset condition, transmitting, via at least two communication systems respectively and based on a pre-specified resource allocation policy, the data segmented by the transmitting end, to enable the data transmitted by each communication system to be completely identical, partially identical, or completely different from each other.

Optionally, a receiving end of the each communication service receives a corresponding data packet via one or more communication systems corresponding to the each communication service, and determines the data packets received correctly and the data packets received incorrectly, and orders and recombines the data packets received correctly and the data packets received incorrectly; and if there is still incorrect data in the recombined data, the receiving end discards the incorrect data, or performs an error correction, or retransmits the incorrect data.

Optionally, a receiving end of the each communication service receives a corresponding data packet via one or more communication systems corresponding to the each communication service, and determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or retransmits the incorrect data.

Optionally, the data packets received incorrectly are detected by a corresponding communication system, and the communication system notifies the data packets to the receiving end or does not notify the data packets to the receiving end; or the data packets received incorrectly are determined by being verified by the receiving end.

Optionally, the data packets received incorrectly are detected by a corresponding communication system, and the communication system forwards the data packets to the receiving end or does not forward the data packets to the receiving end.

A communication device is further provided in the present disclosure, including:

an establishing unit, configured to establish a scenario and determine a task of the scenario, where a plurality of communication systems exist in the scenario, and the task is completed via at least one communication service;

a selecting unit, configured to select at least one communication system for the task from the plurality of communication systems; and a control unit, configured to control the at least one communication system to transmit the communication service required by the task.

Optionally, the establishing unit is configured to establish the scenario by using attribute information and scenario information acquired, determine the task of the scenario, and configure a scenario tag for a communication device and/or a user account in the scenario, where the attribute information includes attribute information of the communication device and/or attribute information of a communication network, and the scenario information includes at least one of resource information, environmental information and user account information of the communication system.

Optionally, the selecting unit is configured to select at least one communication system for the task from the plurality of communication systems based on a requirement of the task, scenario information of the scenario and a pre-specified resource allocation policy, and determine configuration information of a bearer to be established by each of the communication systems of the at least one communication system, where the configuration information includes at least one of a service quality, a security parameter, and a channel resource parameter.

Optionally, the control unit is configured to control, based on the configuration information of the bearer to be established by the at least one communication system, the at least one communication system to establish the bearer, to transmit via the bearer the communication service required by the task.

Optionally, the at least one communication system meets part or all of service quality requirements of the communication service.

Optionally, the control unit is configured to, based on configuration information of the bearer to be established by the selected communication system, transmit a bearer resource configuration message to the at least one communication system, where the at least one communication system establishes the bearer based on the bearer resource configuration message, and the communication service required by the task is transmitted by the established bearer; or the control unit is configured to, based on configuration information of the bearer to be established by the selected communication system, transmit a bearer establishment message to the at least one communication system, where the at least one communication autonomously determines resource configuration parameters and establishes the bearer, and the communication service required by the task is transmitted by the established bearer.

Optionally, the task includes a communication task, a command task, or a control task; and a plurality of communication systems are selected for part or all of the communication services of the at least one communication service, and the communication services corresponding to the plurality of communication systems are transmitted by a plurality of communication systems cooperatively.

Optionally, the communication system selected for each communication service does not include a communication system that initiates the each communication service; or the communication system selected for each communication service includes a communication system that initiates the each communication service and at least one communication system other than the communication system that initiates the each communication service.

Optionally, a transmitting end of each communication service segments generated data to obtain data packets to be transmitted in one or more communication systems corresponding to the each communication service, the transmitting end numbers the data packets, and then the numbered data packets are transmitted via one or more communication systems corresponding to the each communication service, where the segmented data includes encoded data or uncoded data.

Optionally, the device further includes:

a transmitting module configured to, if the communication quality meets a preset condition, transmit, via at least two communication systems respectively and based on a pre-specified resource allocation policy, the data segmented by the transmitting end, to enable the data transmitted by each communication system to be completely identical, partially identical, or completely different from each other.

Optionally, a receiving end of the each communication service receives a corresponding data packet via one or more communication systems corresponding to the each communication service, and determines the data packets received correctly and the data packets received incorrectly, and orders and recombines the data packets received correctly and the data packets received incorrectly; and if there is still incorrect data in the recombined data, the receiving end discards the incorrect data, or performs an error correction, or retransmits the incorrect data.

Optionally, a receiving end of the each communication service receives a corresponding data packet via one or more communication systems corresponding to the each communication service, and determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or retransmits the incorrect data.

Optionally, the data packets received incorrectly are detected by a corresponding communication system, and the communication system notifies the data packets to the receiving end or does not notify the data packets to the receiving end; or the data packets received incorrectly are determined by being verified by the receiving end.

Optionally, the data packets received incorrectly are detected by a corresponding communication system, and the communication system forwards the data packets to the receiving end or does not forward the data packets to the receiving end.

A communication device is further provided in the present disclosure, including a processor, a memory, and a computer program stored in the memory and capable of being executed by the processor, where the computer program is executed by the processor to perform the communication method hereinabove.

A computer-readable storage medium is further provided in the present disclosure, where a computer program is stored in the computer-readable storage medium, where the computer program is executed by the processor to perform the communication method hereinabove.

The above technical solutions of the present disclosure may have the following technical effects:

According to the embodiments of the present disclosure, a scenario is established and a task of the scenario is determined, where a plurality of communication systems exist in the scenario, and the task needs to be completed via at least one communication service; at least one communication system is selected for the task from the plurality of communication systems; and the at least one communication system is controlled to transmit the communication service required by the task. It this way, it is able to flexibly select a communication system from a plurality of communication systems to transmit the communication service, thereby improving the quality and reliability of communication.

DETAILED DESCRIPTION

In order that the technical problems to be solved by the present disclosure as well as the technical solutions and advantages will become clearer, the present disclosure will be described in detail below in conjunction with the accompanying drawings and specific embodiments.

Figure 1:
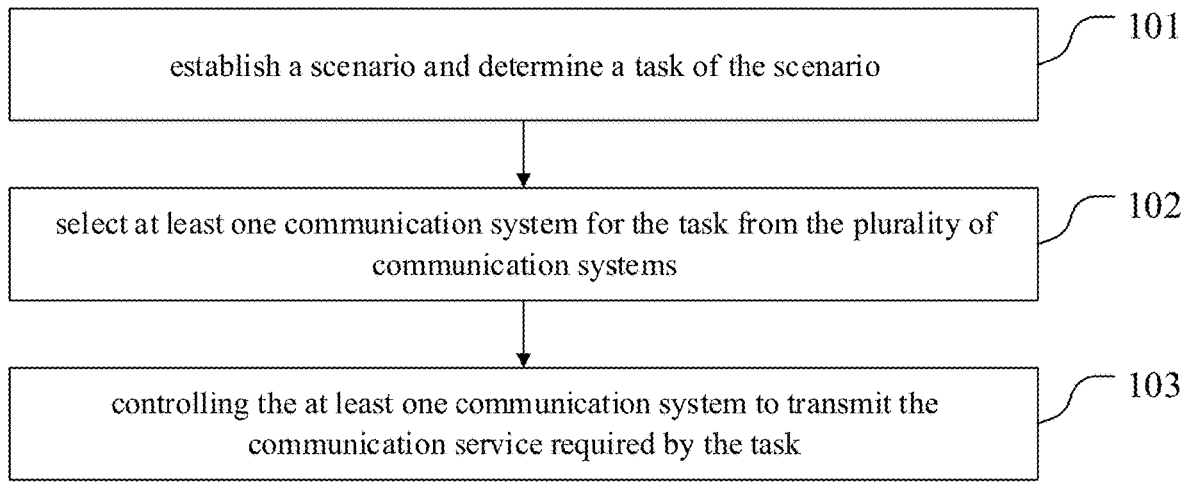
FIG. 1 is a flow chart showing a communication method in some embodiments of the present disclosure.

Referring to FIG. 1, a communication method is provided in some embodiments of the present disclosure, including the following steps as shown in FIG. 1:

101: establishing a scenario and determining a task of the scenario, wherein a plurality of communication systems exist in the scenario, and the task needs to be completed via at least one communication service;

102: selecting at least one communication system for the task from the plurality of communication systems; and 103: controlling the at least one communication system to transmit the communication service required by the task.

In some embodiments of the present disclosure, a scenario may be defined as a set of resources in which a plurality of communication systems exist. The communication systems may be communication system of a different modes, different networks, or different protocols, e.g., WIFI communication system, television broadcast communication system, 4G communication system, 5G communication system, wireless local area network (WLAN) communication system, wireless sensor network (WSN) communication system, satellite communication system, microwave communication system, short wave communication system, or ultrashort wave communication system and the like, which are not limited in the embodiments of the present disclosure. The establishing a scenario may be interpreted as integrating or binding resources of the communication systems and the communication device corresponding to the task, to obtain a specific scenario. Optionally, a user identity or a communication device or a geographical location information may be selected as an anchor point, and a scenario is organized and established according to a preset rule. For example, all communication devices of a user are classified into the same scenario, and these devices may belong to different operator networks, or different communication technology systems are adopted, and different communication frequency bands are used; or all communication devices within a specific site are included into the same scenario, the devices ranging from a person, a family or a private car to a variety of users and devices in land, sea and air within a certain geographical region. These devices may belong to different users, and priorities may be set for the users, wherein users with a high priority in the scenario may use more communication devices and network resources, and users with a low priority may also be authorized by a network administrator to use a certain range of network. In addition, the above scenario may be a communication scenario, for example, communication between people, communication between a person and a device, communication between a device and a device; or the above scenario may be a control scenario, for example, control over certain people and devices; or the above scenario may be a command scenario, for example, command to certain people and devices.

In addition, the above task may be a task that needs to be completed in the above scenario, for example, a communication tasks, a control task, a command task, and the like, and each task needs to be completed with the aid of at least one communication service, that is, each task includes at least one communication service. The communication service may be a data service transmitted between a transmitting end and a receiving end, for example, video service, telephone service, image transmission service, signaling service or file transmission service, etc. The at least one communication service may be a communication service of one or more communication devices.

The selecting at least one communication system for the task from the plurality of communication systems may be: selecting one or more communication systems for each communication service from the plurality of communication systems, that is, each communication service may correspond to one or more communication systems, and communication systems corresponding to different communication services may be the same communication system. Of course, different communication services may correspond to different communication systems. In addition, the selection may be performed according to the requirements of the communication service. For example, if a certain communication service requires a higher transmission rate, then a communication system with a higher transmission rate may be selected for the communication service so that the communication service is transmitted by the communication system independently, or the communication service may be transmitted by a plurality of communication systems cooperatively. By providing a higher transmission rate, the quality of communication is also improved to a certain degree, since the communication quality is usually measured by indicators including transmission rate, time delay, and error rate.

When corresponding communication systems have been selected for the communication services, the communication systems can be controlled to transmit the corresponding communication services. For example, if the communication system a and the communication system b are selected for the communication service A, the communication system a and the communication system b can be controlled to cooperatively transmit the communication service A. For example, the data of the communication service A is divided into two parts, which are transmitted by the communication system a and the communication system b respectively to improve the quality, reliability and security of the communication.

In some embodiments of the present disclosure, with the foregoing steps, it is possible to flexibly select a corresponding communication system for a task in a plurality of communication systems. Compared with the related art in which a fixed communication system is used for the task for transmission, the quality and reliability of the communication may be improved. In addition, the scenario-based communication system may provide communication users with services of greater bandwidth, and more kinds of high-quality multimedia services, and facilitates faster compatibility with a plurality of communication systems; moreover, more communication channel redundancy is provided, and the security and robustness of communication are enhanced.

Figure 2:
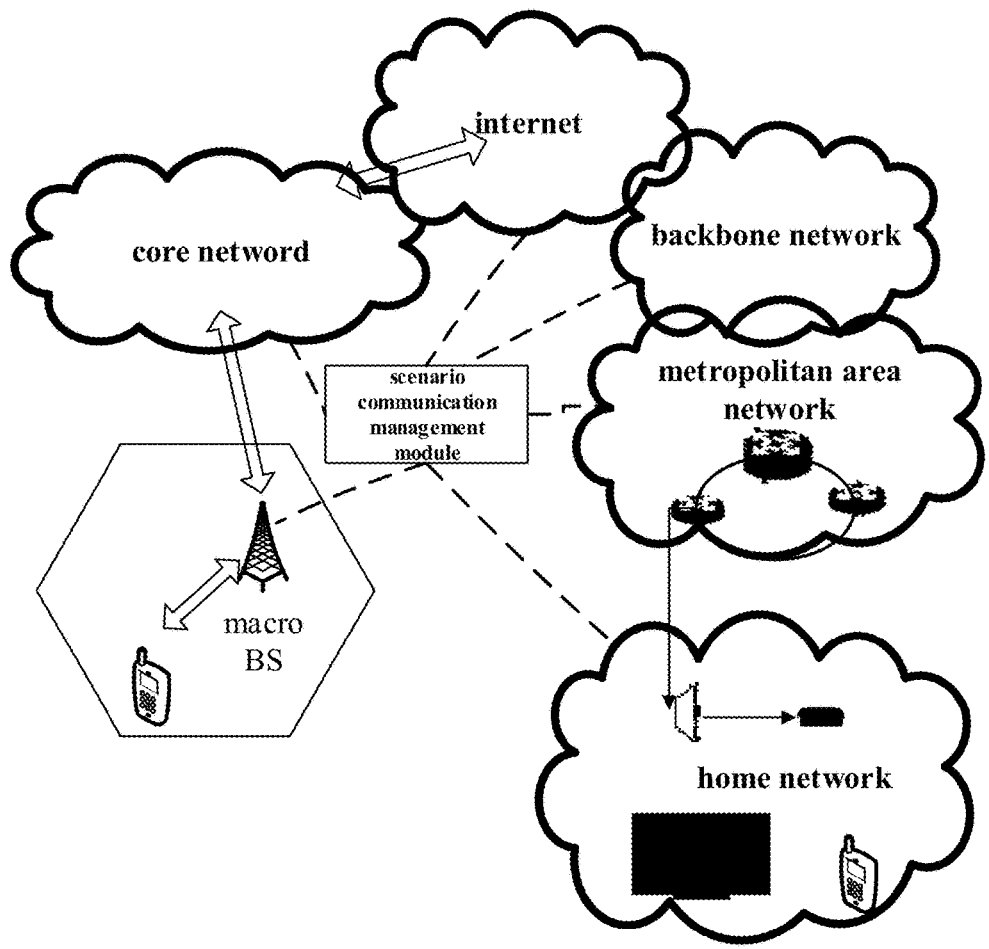
FIG. 2 is a schematic view of a communication structure in some embodiments of the present disclosure.

It should be noted that, in some embodiments of the present disclosure, the foregoing method may be applied to a scenario communication management module, that is, the scenario communication management module implements the foregoing method, where the scenario communication management module may be a software module or a hardware module, or a module in which software and hardware are integrated. The scenario communication management module may be a module in the network device, for example, a scenario communication management module in a network device such as a service gateway, a mobility management entity, a multi-services management platform (MSMP), or a network server. Alternatively, the above-mentioned scenario communication management module may also be a module in a new communication device in some embodiments of the present disclosure, which is not limited in embodiments of the present disclosure. As shown in FIG. 2, the scenario communication management module may transmit messages to a network such as a core network, an Internet, a backbone network, a metropolitan area network, and a home network, and can also perform message interaction with a base station, such as a macro base station (Macro BS). In FIG. 2, the network interfaces of the scenario communication management module and individual communication systems are denoted by broken lines.

Optionally, the establishing the scenario and determining the task of the scenario includes:

establishing the scenario by using attribute information and scenario information acquired, determining the task of the scenario, and configuring a scenario tag for a communication device and/or a user account in the scenario, where the attribute information includes attribute information of the communication device and/or attribute information of a communication network, and the scenario information includes at least one of resource information, environmental information and user account information of the communication system.

The attribute information of the communication device may include information such as a user, a communication mode, and/or a belonging party and a management party of the network, and the attribute information of the above communication network may include information such as supported device models, network capacity, available resources, available quality of services (QoS), important management nodes in the network, encryption modes, and/or secret keys.

The resource information may include information such as the number of available communication systems and devices, channel capacity and quality, system load, and energy consumption in each communication system; and the environmental information may include information such as noise, attenuation, and interference levels of channels in each communication system, and may also include information such as the user's geographic location and ambient temperature, humidity, gas/liquid concentration and pressure, and the surrounding user's work condition. Moreover, the foregoing environmental information may be information such as measurement information of the communication environment, user timing, and identity that the communication system reports during the connection establishment process, such as signal strength measurement, path loss measurement, interference and noise level measurement, timing deviation, and the like.

The establishing the scenario by using the attribute information and scenario information acquired and determining the task of the scenario may be: establishing a scenario of the communication device corresponding to the attribute information and the scenario information, and determining a task that needs to be transmitted in the scenario based on the attribute information and the scenario information.

In addition, the above attribute information and the scenario information may be acquired in advance, or may be acquired by receiving what the communication network and the communication measurement have reported. For example, each communication network and each communication device may have its own predetermined measurement reporting mechanism, so as to timely know about a change in the environment, thereby ensuring the quality of communication. Especially, the reporting of the measurement in the communication process may be more timely and more comprehensive, and such a reporting of measurement may be periodic or event-triggered. The reported content mainly includes network status, energy consumption level, a change of the channel, a distribution of the users, and/or an indication of the quality of the link, etc., so that the above scenario can be managed in time by using the reported information, that is, the scenario task of the scenario may also change with the change of time and space and a conversion of the user. Changed. For example, the scenario management module collects status information of each communication network, measurement report of the communication device, and communication request of the user to establish a complete scenario, and timely updates the information of the scenario.

In this embodiment of the present disclosure, since the scenario is established by using the attribute information and scenario information acquired, and the task of the scenario is determined, the scenario may be established more accurately, and the corresponding task may be determined more accurately. Of course, in some embodiments of the present disclosure, it is not limited to using the attribute information and the scenario information to establish the scenario and the determine the task of the scenario. For example, a request reported by the communication device may also be used to establish the corresponding scenario and determine the corresponding task.

Optionally, the selecting at least one communication system for the task from the plurality of communication systems includes:

selecting at least one communication system for the task from the plurality of communication systems based on a requirement of the task, scenario information of the scenario and a pre-specified resource allocation policy, and determining configuration information of a bearer to be established by each of the communication systems of the at least one communication system, where the configuration information includes at least one of a service quality, a security parameter and a channel resource parameter.

For the scenario information, reference may be made to the corresponding description of the previous embodiment, and details are omitted herein. The selecting at least one communication system for the task from the plurality of communication systems based on a requirement of the task, scenario information of the scenario and a pre-specified resource allocation policy may be: performing statistics, analysis and calculation on the requirement of the task and scenario information to obtain the relationship between the requirement of the task and the transmission resources of each communication system, and then selecting a corresponding communication system for the task from the plurality of communication systems according to the pre-acquired resource allocation policy. The resource allocation policy may perform resource allocation ordering on the communication systems in the scenario, and may set a service type that each communication system preferentially assumes. The criteria for ordering include ordering by how many channel resources are available, ordering by the magnitude of system load, ordering by system/channel interference and noise level, ordering by energy consumption of devices, ordering by delay of communication transmission, ordering by signal transmission quality and reliability, or ordering by user-preset priorities and so on. In this way, it is possible to select one or more communication systems suitable for each task, and to determine for each task the configuration information of the bearer that needs to be established, in the corresponding communication system.

In this embodiment of the present disclosure, the communication system is selected and the configuration information of the bearer is determined according to the requirement of the task and the scenario information of the scenario, and according to the resource allocation policy acquired in advance, which is more advantageous for the transmission of the task, so as to further improve the transmission effect. Of course, in some embodiments of the present disclosure, the communication system may also be selected for the task in other manners, for example, directly selecting a plurality of communication systems for each task for transmission.

Optionally, the controlling the at least one communication system to transmit the communication service required by the task includes:

controlling, based on the configuration information of the bearer to be established by the at least one communication system, the at least one communication system to establish a corresponding bearer, to transmit via the corresponding bearer the communication service required by the task.

In this embodiment of the present disclosure, after the configuration information of each communication system is determined, each communication system may be controlled to establish a corresponding bearer, thereby further improving the transmission effect.

Optionally, the at least one communication system meets part or all of service quality requirements of the communication service, which means that any communication system corresponding to each communication service may meet part or all of the service quality requirements of the communication service, or all communication systems corresponding to each communication service may meet part or all of the service quality requirements of the communication service. For example, when a plurality of communication systems are selected for a certain communication service, the total service quality of the plurality of communication systems meets the service quality requirements of the communication service. For example, suppose a transmission rate of $\lambda$ bits per second is finally required after a certain communication service is encoded. The system selects a total of n systems, $S1, S2, \ldots, Sn$, to provide services for the communication service, and each communication system can provide a bearing rate of $v1, v2, \ldots, vn$, then $v1+v2+\ldots+vn \geq \lambda$.

In this embodiment of the present disclosure, since the at least one communication system meets part or all of the service quality requirements of the communication service, the transmission quality of each task may be guaranteed.

Optionally, the controlling the at least one communication system to establish the corresponding bearer includes:

transmitting a bearer resource configuration message to the at least one communication system, and establishing a corresponding bearer by the at least one communication system according to the bearer resource configuration message; or transmitting a bearer establishment message to the at least one communication system, and autonomously determining resource configuration parameters and establishing a corresponding bearer by the at least one communication system.

The above bearer resource configuration message may be understood as recommended information for the communication system to establish a bearer, that is, the communication system uses a corresponding channel resource to establish a corresponding bearer according to the recommended information. Of course, the above bearer resource configuration message may also carry configuration information of the bearer, so that the communication system establishes a corresponding bearer. In addition, the bearer establishment message may carry configuration information of the bearer, so that the communication system establishes a corresponding bearer. In this way, a channel allocating and scheduling module of the communication system can be autonomously completed by the bearer establishment message. In addition, when the bearer of the communication system is established, it may be said that the preparation work for data transmission is completely finished.

In this embodiment, the establishment of the bearer may be completed in the above two ways to improve the flexibility of service transmission.

Optionally, the task includes a communication task, a command task, or a control task; and a plurality of communication systems are selected for part or all of the communication services from the at least one communication service, and the communication services corresponding to the plurality of communication systems are transmitted by a plurality of communication systems cooperatively.

The above cooperative transmission may be that a plurality of communication systems jointly complete the transmission of the communication service. For example, each communication system transmits a part of the data packets of the communication service, so as to quickly complete the transmission of the communication service.

Optionally, for each communication service, the communication system selected for the communication service does not include a communication system that initiated the communication service; or for each communication service, the communication system selected for the communication service includes a communication system that initiated the communication service, and further includes at least one communication system other than the communication system that initiated the communication service.

In this embodiment, the communication system selected for the communication service may be a communication system that initiated the communication service, which is more advantageous for improving the transmission efficiency, reliability, and security of the service. In some scenarios, the communication system that initiated the communication service is often not suitable for transmitting the service. For example, a mobile terminal initiates a high-definition video service through a mobile communication system. However, due to the transmission rate or resources of the mobile communication system, the video service cannot be transmitted. Therefore, with the above steps, a television communication system can be selected to transmit the above video service. In addition, since the communication system that initiated the communication service and at least one communication system other than the communication system that initiated the communication service may be selected, the transmission of the service through a plurality of communication systems may be realized, thereby improving the transmission efficiency, reliability and security of the service.

Optionally, for each communication service, a transmitting end of the communication service segments generated data to obtain data packets to be transmitted in one or more communication systems corresponding to the communication service, numbers the data packets, and transmits the numbered data packets via one or more communication systems corresponding to the communication service, where the segmented data includes encoded data or uncoded data.

Figure 3:
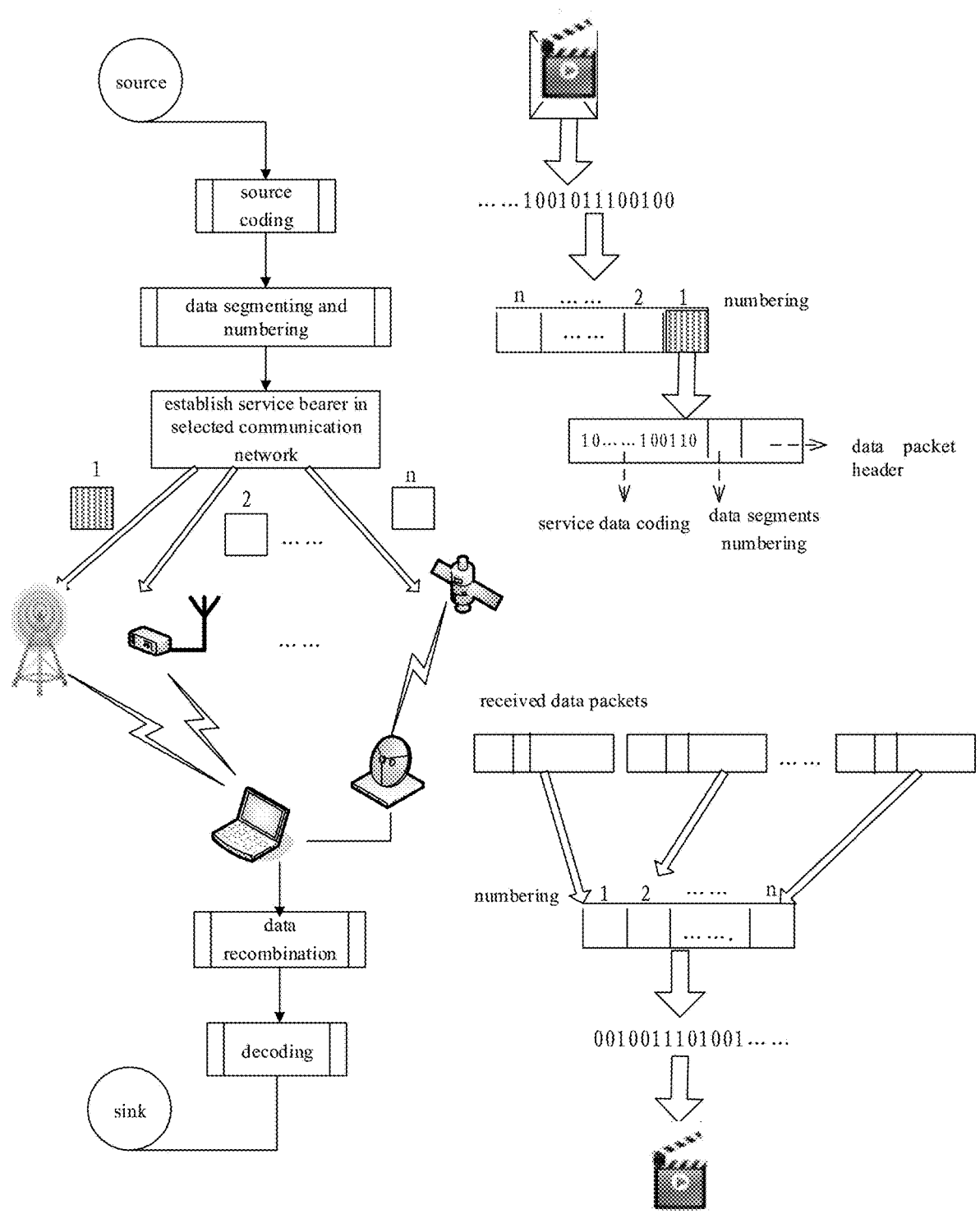
FIG. 3 is a schematic view of another scenario communication in some embodiments of the present disclosure.

In this embodiment, after the data packets are numbered, transmission is performed through a plurality of communication systems to improve transmission efficiency and ensure the quality of communication service transmission. For example, as shown in FIG. 3, the transmitting end encodes the data generated by an application layer, segments it to obtain data packets suitable for transmission by one or more allocated communication systems, and numbers the data packets; then, the data packets are transmitted to individual communication systems for transmission, and signal processing methods (such as spread spectrum, modulation, transmit diversity, or link adaptation, etc.) and communication technical means supported by the system and device may also be applied to ensure the communication to be real-time and effective. The coding herein may be re-coding. For example, after the source coding, channel coding is performed again, and the re-coding may be performed at the transport layer or the application layer, and the selected one or more communication systems are considered as individual channels respectively. Although re-coding and re-decoding may increase system complexity and delay, once a certain frequency band is subjected to strong interference or a system fails, it can be quickly compensated by binding the communication channels of other communication systems, so that the communication robustness of the entire scenario is not affected. In terms of security, even if a system is eavesdropped or cracked, only broken and fragmented information can be obtained, which will not affect the security of the entire scenario communication. The above uncoded data may be data that will not be re-coded after source coding.

Optionally, in this implementation, for each communication service, a receiving end of the communication service receives a corresponding data packet via one or more communication systems corresponding to the communication service, determines data packets received correctly and data packets received incorrectly, and orders and recombines the data packets received correctly and the data packets received incorrectly; and if there is still incorrect data in the recombined data, the receiving end discards the incorrect data, or performs an error correction, or retransmits the incorrect data.

In this embodiment, data packets may be received through a plurality of communication systems, and since the data packets are numbered, the receiving end ay effectively perform ordering and recombining to obtain data transmitted by the transmitting end. For example, as shown in FIG. 3, the receiving end performs signal processing (including diversity combining, de-spreading, demodulation, error correction, or retransmission, etc.) according to its own inherent process after receiving data through various communication systems in the scenario. The data is ordered and recombined at the application layer according to the numbering. After verification, the data packets that fail to be received may be discarded, and an error correction may also be performed. In addition, in the data transmission process, each communication system may also feed back the numberings of the data packets that fail to be received to the transmitting end. The transmitting end decides whether to retransmit the data packets that fail to be transmitted, and may also retransmit the data packets spontaneously according to the condition of the received data. Generally, it is more efficient to decide, by the entity which determines packet loss at the receiving end, whether retransmission scheduling is required.

Optionally, the method further includes:

if the communication quality meets a preset condition, transmitting the data segmented by the transmitting end via at least two communication systems respectively according to a pre-specified resource allocation policy, so that the data transmitted by the communication systems are completely identical, partially identical, or completely different from each other.

The above preset condition may be a preset condition that the communication quality is poor, for example, the channel condition is extremely unstable or the channel quality is generally poor. In this way, the scenario communication management module can separately transmit the segmented data through at least two communication systems when special conditions such as extremely unstable channel conditions or generally poor channel quality occur. Since the data transmitted by each communication system is completely identical or partially identical, the segmented data transmitted by the transmitting end can be copied into several copies and transmitted to different communication networks and devices in the scenario for transmission, and then at the receiving end, the copies are selected or merged to improve the probability of correct reception at the receiving end. The above resource allocation policy is pre-configured. For example, the allocation policy may be allocating backup data according to parameters such as available resources and transmission rates of the communication systems, such as preferentially allocating to a communication system with more available resources, or preferentially allocating to a communication system with a higher rate. In addition, the at least two communication systems may be at least two of the communication systems selected by the communication service in step 202, or at least two communication systems other than the communication system selected for the communication service, so that more communication systems can be used to transmit communication services to further improve the probability of correct reception at the receiving end. Once a certain frequency band is subjected to strong interference or a system fails, it can be quickly compensated by binding the communication channels of other communication systems, so that the communication robustness of the entire scenario is not affected. In terms of security, even if a system is eavesdropped or cracked, only broken and fragmented information can be obtained, which will not affect the security of the entire scenario communication.

Optionally, in this implementation, for each communication service, a receiving end of the communication service receives a corresponding data packet via one or more communication systems corresponding to the communication service, determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or chooses to retransmit the incorrect data.

In this embodiment, the receiving end may order, merge, and recombine data transmitted by a plurality of communication systems. If there is erroneous data in the merged and recombined data, the erroneous data packets are discarded, or an error correction is performed, or the erroneous data is retransmitted. Because the data transmitted by each communication system may be completely identical or partially identical or completely different, communication performance is improved after the receiving end performs ordering, merging and recombining processing.

Optionally, the data packets received incorrectly are detected by a corresponding communication system, and the communication system notifies the data packets received incorrectly to the receiving end or does not notify the data packets received incorrectly to the receiving end; or the data packets received incorrectly are determined by being verified by the receiving end.

In this embodiment, the data packet received incorrectly may be detected by a corresponding communication system, and the communication system notifies the data packets received incorrectly to the receiving end or does not notify the data packets received incorrectly to the receiving end, so that the overall performance of the scenario may be improved, since each communication system may determine whether the receiving end needs to be notified based on attribute information of the scenario to avoid some unwanted notifications.

Optionally, the data packets received incorrectly are detected by a corresponding communication system, and the communication system forwards it to the receiving end or does not forward it to the receiving end.

In this embodiment, the data packets received incorrectly may be detected by a corresponding communication system, and the communication system forwards the data packets to the receiving end or does not forward the data packets to the receiving end, so that the overall performance of the scenario may be improved, since each communication system may determine whether to forward the data packet to the receiving end based on attribute information of the scenario to avoid some unwanted forwarding.

Hereinafter, some embodiments of the present disclosure are exemplified:

Example 1

Assume that in a home scenario, User A and User B have two mobile phones (belonging to mobile operator networks X and Y respectively), one PAD, one WIFI wireless gateway, one broadband interface (belonging to a fixed broadband operator Z), and one large-screen smart TV (which supports wireless communication protocols, such as WiFi, and also supports other smart TV protocols such as DLNA or Airplay) in total. The scenario communication management module can bind the above digital devices into one device in a scenario and tag them as the same scenario, according to the user ID, the device identifier, the capability information, the geographical location information, and the device communication history information.

Assume that user A on the way to work finds a popular movie through a "TX Video" APP on the mobile phone. Limited by the screen size of the mobile phone and pixel resolution requirements, a video stream service with QoS requirement of 128 kbps may be established if online viewing is desired. A service request is submitted via the operator's mobile communication network X to initiate a connection establishment request to the website server where the video is located.

The scenario management module finds that the video belongs to a high-definition video through the corresponding message of the web server. The best image quality requires a 4G traffic to complete the playing of the video, while the 128 kbps service is insufficient to support the image quality requirement, so the user can be prompted to download in advance and go home to watch the video on the television.

After the user clicks the download link to confirm, the scenario communication management module will connect to a home WiFi through a cable broadband, further contact the TV, and then establish a communication connection between the TV and the website server. The download service is initiated during an idle period of the network in the daytime to avoid network peaks in the evening and realize high-speed downloading, and the downloaded video is cached inside the TV.

After User A comes off work at night, the mobile phone is connected to the wireless gateway in the home through WiFi, so that the scenario communication management module knows that the user has returned home.

Then, according to the previous historical information of the user watching the television, the scenario communication management module prompts the movie information cached by the television in the daytime to the user through the mobile phone in a suitable time period, and after the user confirms, the movie can be played using the television in the home, so that the user A obtains better video viewing experience.

At the same time, User B can also be shared with the movie through User A's operation on the APP. User B uses the PAD device to connect to the TV through the WiFi gateway, establishes a video stream service with QoS requirement of 384 bps, and can also watch the movie in other rooms.

Example 2

Assume that there are four communication systems A, B, C, and D in a scenario. The noise and interference levels are at a medium level. A first user on the network side wants to transmit a map file to a second user on the terminal side. The file size is relatively large, and the requirements on the delay of file information, the packet loss rate and security are relatively high.

The first user initiates a service connection request at system A and reports service QoS and security requirements.

The scenario communication management module analyzes the scenario information and evaluates the service requirements and the system load, and then finds that none of the independent systems can complete the file transmission within the required time.

In the past, when the respective networks were independently managed, this service may be rejected, or the system may transmit as much as possible based on the existing resources. If other services can release the channel, all the channel resources are allocated to the task; as a result, the QoS cannot be guaranteed, and if there is malicious interference and eavesdropping, there is no guarantee that the second user can securely receive the correct map file.

Figure 4:
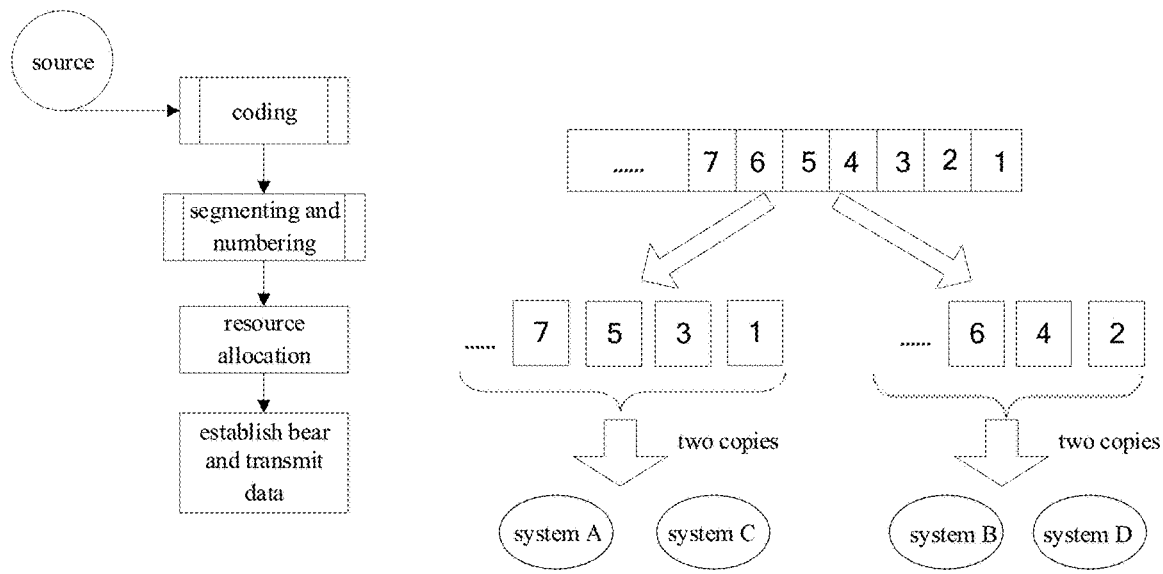
FIG. 4 is a schematic view of another scenario communication in some embodiments of the present disclosure.

According to the method of the present disclosure, as shown in FIG. 4, the scenario communication management module may re-code the file to be transmitted by system A, and segment and number the encoded data to formulate a resource allocation scheme as follows:

the data segments numbered 1, 3, 5, 7, . . . are handed over to systems A and C for simultaneous transmission, that is, two copies are transmitted; and the data segments numbered 2, 4, 6, 8, . . . are handed over to systems B and D for simultaneous transmission.

The four systems A, B, C, and D will establish data bearers according to the requirements of scenario communication, and complete the transmission of delivered data.

Figure 5:
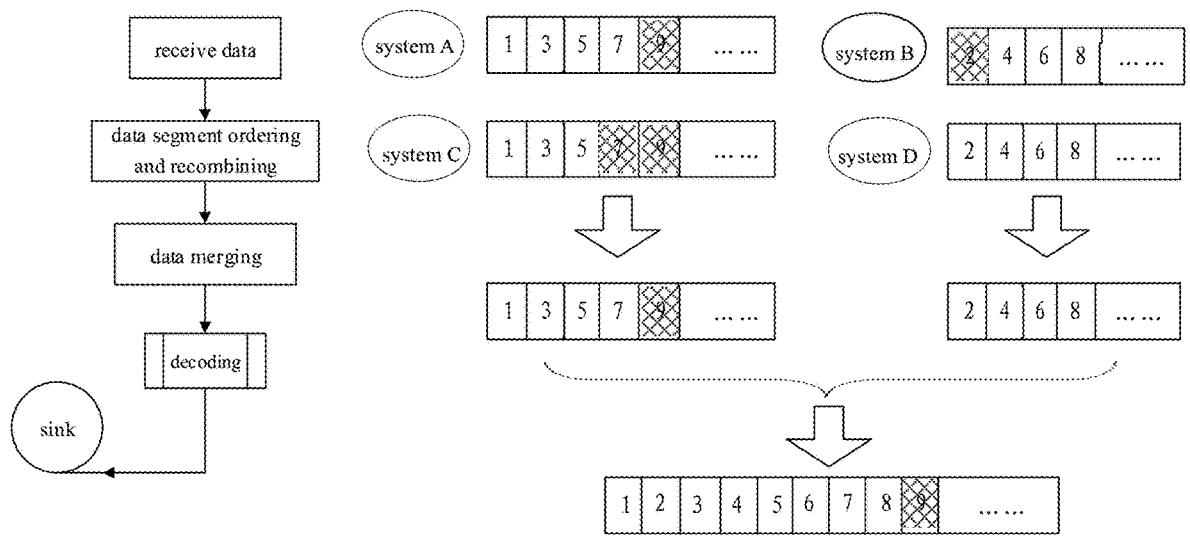
FIG. 5 is a schematic view of another scenario communication in some embodiments of the present disclosure.

At the receiving end, the data packets submitted by the four communication systems A, B, C, and D are verified first, and then the correct data segments are recombined and merged according to the numbering sequence, as shown in FIG. 5. wherein the data segments marked with a shadow are data segments verified as erroneous, and the other blank data segments marked only with the numbering are data segments verified as correct.

For the data segments numbered 1, 3, and 5, if the transmissions of both systems A and C are correct, one copy is reserved for data merging;

for the data segments numbered 4, 6, and 8, if the transmissions of both systems B and D are correct, one copy is reserved for data merging;

for the data segment numbered 2, if the transmission of system D is correct and the transmission of system B is erroneous, the data segment submitted by system B is discarded, and the data segment submitted by system D is reserved for merging;

for the data segment numbered 7, if the transmission of system A is correct and the transmission of system C is erroneous, the data segment submitted by system C is discarded, and the data segment submitted by system A is reserved for merging; and for the data segment numbered 9, since the transmissions of both systems A and C are erroneous, it can be determined whether to trigger the retransmission of the data segment according to the requirements of the scenario communication system on the quality of file transmission. The retransmission may be performed in systems A or C, or may be performed by re-allocating resources in systems A, B, C, and D.

In this example, since more communication resources are provided, the solution of the present disclosure can significantly increase the rate of file transmission while also providing multiple copies, which provides a favorable guarantee for the correctness of file transmission; considering different communication frequency bands of various communication systems and communication capabilities of their own characteristics, the probability of a plurality of systems failing at the same time is obviously lower, thus reducing the probability and delay of retransmission of the entire scenario communication system. Therefore, the solution using the scenario communication can meet the communication requirements of the user, which however cannot be met by the solutions in the related art.

According to the above solutions, the scenario-based communication system can provide communication users with services of greater bandwidth, and a wider range of high-quality multimedia services, and facilitates faster compatibility with a plurality of communication systems; moreover, more communication channel redundancy is provided, and the security and robustness of communication are enhanced. Although re-coding and re-decoding at the application layer may increase system complexity and delay, once a certain frequency band is subjected to strong interference or a system fails, it can be quickly compensated by binding the communication channels of other communication systems, so that the communication robustness of the entire scenario is not affected. In terms of security, even if a system is eavesdropped or cracked, only broken and fragmented information can be obtained, which will not affect the security of the entire scenario communication.

It is to be noted that the various possible implementations of the present disclosure may be implemented in combination with each other, or may be implemented separately, which are not limited herein.

In some embodiments of the present disclosure, a scenario is established and a task of the scenario is determined, wherein a plurality of communication systems exist in the scenario, and the task needs to be completed via at least one communication service; at least one communication system is selected for the task from the plurality of communication systems; and the at least one communication system is controlled to transmit the communication service required by the task. It this way, it is able to flexibly select a communication system in a plurality of communication systems to transmit communication service, thereby improving the quality and reliability of communication.

Figure 6:
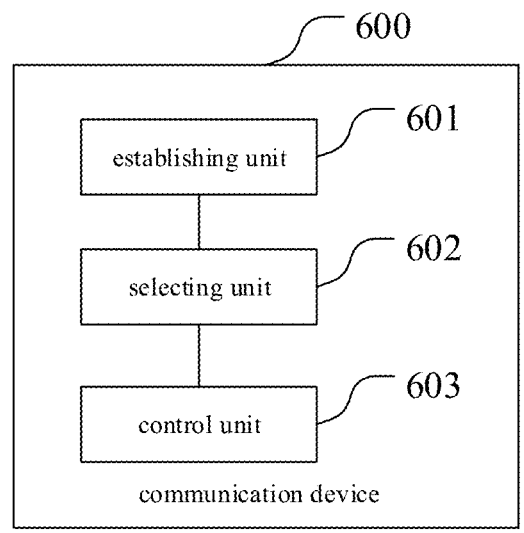
FIG. 6 is a structural view of a communication device in some embodiments of the present disclosure.

Reference is made to FIG. 6, which is a structural view of a communication device in some embodiments of the present disclosure. As shown in FIG. 6, the communication device 600 includes:

an establishing unit 601, configured to establish a scenario and determine a task of the scenario, where a plurality of communication systems exist in the scenario, and the task needs to be completed via at least one communication service;

a selecting unit 602, configured to select at least one communication system for the task from the plurality of communication systems; and a control unit 603, configured to control the at least one communication system to transmit the communication service required by the task.

Optionally, the establishing unit 601 is configured to establish a scenario by using acquired attribute information and scenario information, determine a task of the scenario, and configure a scenario tag for each communication device and/or user account in the scenario, where the attribute information includes attribute information of the communication device and/or attribute information of a communication network, and the scenario information includes at least one of resource information, environmental information and user account information of the communication system.

Optionally, the selecting unit 602 is configured to, according to a requirement of the task and scenario information of the scenario and based on a pre-specified resource allocation policy, select at least one communication system for the task from the plurality of communication systems, and determine configuration information of a bearer to be established by each of the communication systems of the at least one communication system, wherein the configuration information includes at least one of a service quality, a security parameter, and a channel resource parameter.

Optionally, the control unit 603 is configured to control, based on the configuration information of the bearer to be established by the at least one communication system, the at least one communication system to establish the bearer, to transmit via the bearer the communication service required by the task.

Optionally, the at least one communication system meets part or all of service quality requirements of the communication service.

Optionally, the control unit 603 is configured to, based on configuration information of the bearer to be established by the selected communication system, transmit a bearer resource configuration message to the at least one communication system, where the at least one communication system establishes the corresponding bearer based on the bearer resource configuration message, and the communication service required by the task is transmitted by the established bearer; or the control unit 603 is configured to, based on configuration information of the bearer to be established by the selected communication system, transmit a bearer establishment message to the at least one communication system, where the at least one communication autonomously determines resource configuration parameters and establishes the corresponding bearer, and the communication service required by the task is transmitted by the established bearer.

Optionally, the task includes a communication task, a command task, or a control task; and a plurality of communication systems are selected for part or all of the communication services of the at least one communication service, and the communication services corresponding to the plurality of communication systems are transmitted by a plurality of communication systems cooperatively.

Optionally, for each communication service, the communication system selected for the communication service does not include a communication system that initiated the communication service; or for each communication service, the communication system selected for the communication service includes a communication system that initiated the communication service, and further includes at least one communication system other than the communication system that initiated the communication service.

Optionally, for each communication service, a transmitting end of the communication service segments generated data to obtain data packets to be transmitted in one or more communication systems corresponding to the communication service, numbers the data packets, and transmits the numbered data packets via one or more communication systems corresponding to the communication service, where the segmented data includes encoded data or uncoded data.

Figure 7:
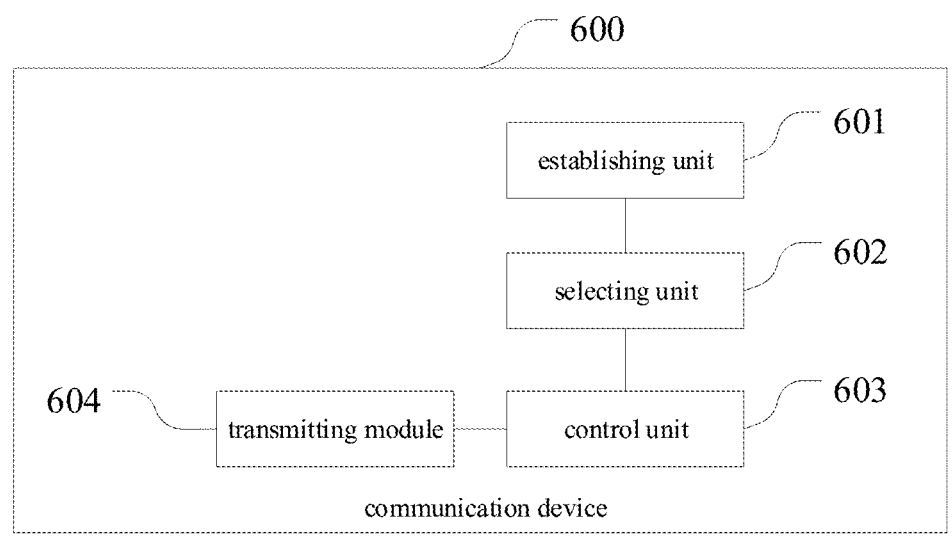
FIG. 7 is a structural view of another communication device in some embodiments of the present disclosure.

Optionally, as shown in FIG. 7, the communication device 600 further includes:

a transmitting module 604 configured to, if the communication quality meets a preset condition, transmit the data segmented by the transmitting end via at least two communication systems respectively according to a pre-specified resource allocation policy, so that the data transmitted by each communication system is completely identical, partially identical, or completely different from each other.

Optionally, for each communication service, a receiving end of the communication service receives a corresponding data packet via one or more communication systems corresponding to the communication service, determines data packets received correctly and data packets received incorrectly, and orders and recombines the data packets received correctly and the data packets received incorrectly; and if there is still incorrect data in the recombined data, the receiving end discards the incorrect data, or performs an error correction, or chooses to retransmit the incorrect data.

Optionally, for each communication service, a receiving end of the communication service receives a corresponding data packet via one or more communication systems corresponding to the communication service, determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or chooses to retransmit the incorrect data.

Optionally, the data packets received incorrectly are detected by a corresponding communication system, and the communication system notifies the data packets received incorrectly to the receiving end or does not notify the data packets received incorrectly to the receiving end; or the data packets received incorrectly are determined by being verified by the receiving end.

Optionally, the data packets received incorrectly are detected by a corresponding communication system, and the communication system forwards the data packets received incorrectly to the receiving end or does not forward the data packets received incorrectly to the receiving end.

It should be noted that, in some embodiments of the present disclosure, the above communication device 600 may be a scenario communication management module according to any implementation of the method embodiments in some embodiments of the present disclosure, and any implementation of the scenario communication management module according to the method embodiments in some embodiments of the present disclosure may be implemented by the above communication device 600 in some embodiments of the present disclosure, while also achieving the same advantageous effects, which will not be described herein again.

Figure 8:
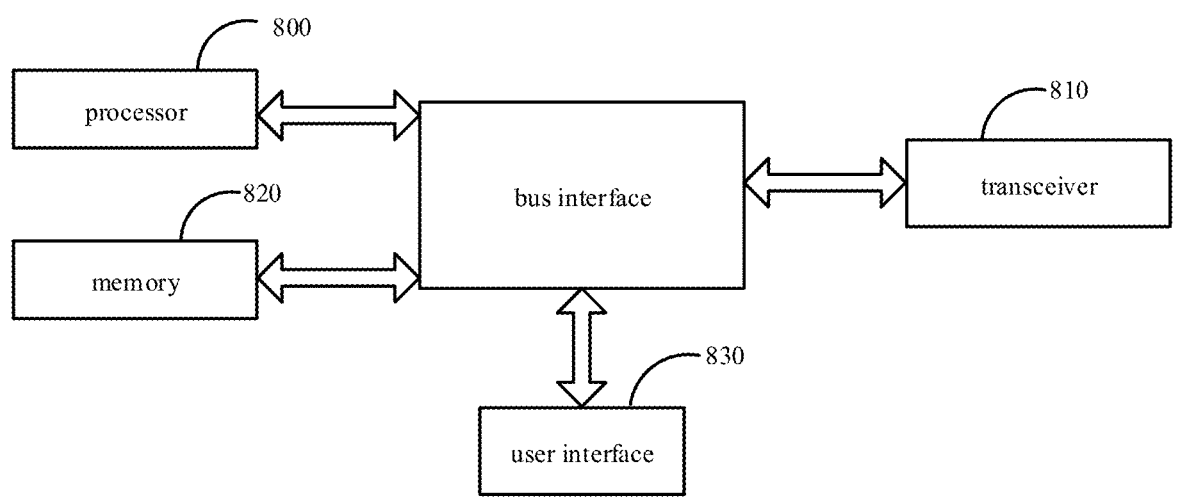
FIG. 8 is a structural view of another communication device in some embodiments of the present disclosure.

Reference is made to FIG. 8, which is a structural view of another communication device in some embodiments of the present disclosure. The communication device includes a processor 800, a transceiver 810, a memory 820, a user interface 830 and a bus interface.

The processor 800 is configured to read a program in the memory 820 and execute the following process:

establishing a scenario and determining a task of the scenario, wherein a plurality of communication systems exist in the scenario, and the task needs to be completed via at least one communication service;

selecting at least one communication system for the task from the plurality of communication systems; and controlling the at least one communication system to transmit the communication service required by the task.

The transceiver 810 is configured to receive and transmit data under the control of the processor 800.

In FIG. 8, a bus architecture may include any number of interconnected buses and bridges. Specifically, various circuits including one or more processors represented by the processor 800 and storages represented by the memory 820 are linked together by the bus architecture. The bus architecture may also link various other circuits together, such as peripherals, voltage regulators, and power management circuits, as is known in the art. Therefore, no further description is given herein. The bus interface provides an interface. The transceiver 810 may be a plurality of elements, including receivers and transmitters, which provide a unit for communicating with various other devices over a transmission medium. For different user devices, the user interface 830 may also be an interface capable of externally or internally connecting with a required device which includes but is not limited to a keypad, a display, a speaker, a microphone, a joystick, etc.

The processor 800 is responsible for managing the bus architecture and the normal processing, and the memory 820 may store data used by the processor 800 in performing operations.

Optionally, the establishing the scenario and determining the task of the scenario includes:

establishing the scenario by using acquired attribute information and scenario information, determining a task of the scenario, and configuring a scenario tag for each communication device and/or user account in the scenario, wherein the attribute information includes attribute information of the communication device and/or attribute information of a communication network, and the scenario information includes at least one of resource information, environmental information and user account information of the communication system.

Optionally, the selecting at least one communication system for the task from the plurality of communication systems includes:

according to a requirement of the task and scenario information of the scenario and based on a pre-specified resource allocation policy, selecting at least one communication system for the task from the plurality of communication systems, and determining configuration information of a bearer to be established by the communication systems in the at least one communication system, where the configuration information includes at least one of service quality, security parameter, and channel resource parameter.

Optionally, the controlling the at least one communication system to transmit the communication service required by the task includes:

according to configuration information of a bearer to be established by the at least one communication system, controlling the at least one communication system to establish a corresponding bearer, and transmitting, by the established bearer, the communication service required by the task.

Optionally, the at least one communication system meets part or all of service quality requirements of the communication service.

Optionally, the controlling the at least one communication system to establish the corresponding bearer includes:

transmitting a bearer resource configuration message to the at least one communication system, and establishing a corresponding bearer by the at least one communication system according to the bearer resource configuration message; or transmitting a bearer establishment message to the at least one communication system, and autonomously determining resource configuration parameters and establishing a corresponding bearer by the at least one communication system.

Optionally, the task includes a communication task, a command task, or a control task; and a plurality of communication systems are selected for part or all of the communication services in the at least one communication service, and the communication services corresponding to the plurality of communication systems are transmitted by a plurality of communication systems cooperatively.

Optionally, for each communication service, the communication system selected for the communication service does not include a communication system that initiated the communication service; or for each communication service, the communication system selected for the communication service includes a communication system that initiated the communication service, and further includes at least one communication system other than the communication system that initiated the communication service.

Optionally, for each communication service, a transmitting end of the communication service segments generated data to obtain data packets to be transmitted in one or more communication systems corresponding to the communication service, numbers the data packets, and transmits the numbered data packets via one or more communication systems corresponding to the communication service, where the segmented data includes encoded data or uncoded data.

Optionally, the method further includes:

if the communication quality meets a preset condition, transmitting the data segmented by the transmitting end via at least two communication systems respectively according to a pre-specified resource allocation policy, so that the data transmitted by each communication system is completely identical, partially identical, or completely different from each other.

Optionally, for each communication service, a receiving end of the communication service receives a corresponding data packet via one or more communication systems corresponding to the communication service, determines data packets received correctly and data packets received incorrectly, and orders and recombines the data packets received correctly and the data packets received incorrectly; and if there is still incorrect data in the recombined data, the receiving end discards the incorrect data, or performs an error correction, or retransmits the incorrect data.

Optionally, for each communication service, a receiving end of the communication service receives a corresponding data packet via one or more communication systems corresponding to the communication service, determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or retransmits the incorrect data.

Optionally, the data packets received incorrectly are detected by a corresponding communication system, and the communication system notifies the data packets received incorrectly to the receiving end or does not notify the data packets received incorrectly to the receiving end; or the data packets received incorrectly are determined by being verified by the receiving end.

Optionally, the data packets received incorrectly are detected by a corresponding communication system, and the communication system forwards data packets received incorrectly to the receiving end or does not forward data packets received incorrectly to the receiving end.

It should be noted that the above communication device in some embodiments of the present disclosure may be a scenario communication management module according to any implementation of the method embodiments in some embodiments of the present disclosure, and any implementation of the scenario communication management module according to the method embodiments in some embodiments of the present disclosure may be implemented by the above communication device in the embodiments of the present disclosure, while also achieving the same advantageous effects, which will not be described herein again.

In some embodiments of the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may also be integrated into one unit. The above integrated unit can be implemented in the form of hardware or in the form of hardware plus software functional units.

The above described integrated unit implemented in the form of a software functional unit can be stored in a computer-readable storage medium. The software functional unit is stored in a memory medium which includes a plurality of instructions for causing a computer device (which may be a personal computer, a server, or a network device, etc.) to execute part of the steps of the transceiving methods of the various embodiments of the present disclosure. The foregoing storage medium includes: a U disk, a mobile hard disk, a Read-Only Memory (ROM), a Random-Access Memory (RAM), a magnetic disk or an optical disk, and various media that can store program codes thereon.

Described above are some embodiments of the present disclosure, and it should be noted that those skilled in the art may also make several improvements and modifications without departing from the principles of the present disclosure, which will also fall within the scope the present disclosure.

What is claimed is:

1. A communication method, comprising:

establishing a scenario and determining a task of the scenario, wherein a plurality of communication systems exist in the scenario, and the task is completed via at least one communication service;

selecting at least one communication system for the task from the plurality of communication systems; and controlling the at least one communication system to transmit the communication service required by the task;

wherein the task comprises a communication task, a command task, or a control task; and the plurality of communication systems are selected for part or all of the communication services of the at least one communication service, and the communication services corresponding to the plurality of communication systems are transmitted by the plurality of communication systems cooperatively;

wherein the communication system selected for each communication service does not include a communication system that initiates the each communication service; or the communication system selected for each communication service comprises a communication system that initiates the each communication service and at least one communication system other than the communication system that initiates the each communication service;

or, a transmitting end of each communication service segments generated data to obtain data packets to be transmitted in one or more communication systems corresponding to the each communication service, the transmitting end numbers the data packets, and then the numbered data packets are transmitted via one or more communication systems corresponding to the each communication service, wherein the segmented data comprises encoded data or uncoded data.

2. The method according to claim 1, wherein the establishing the scenario and determining the task of the scenario comprises:

establishing the scenario by using attribute information and scenario information acquired, determining the task of the scenario, and configuring a scenario tag for a communication device and/or a user account in the scenario, wherein the attribute information comprises attribute information of the communication device and/or attribute information of a communication network, and the scenario information comprises at least one of resource information, environmental information and user account information of the communication system.

3. The method according to claim 1, wherein the selecting at least one communication system for the task from the plurality of communication systems comprises:

selecting at least one communication system for the task from the plurality of communication systems based on a requirement of the task, scenario information of the scenario and a pre-specified resource allocation policy, and determining configuration information of a bearer to be established by each of the communication systems of the at least one communication system, wherein the configuration information comprises at least one of a service quality, a security parameter and a channel resource parameter.

4. The method according to claim 3, wherein the controlling the at least one communication system to transmit the communication service required by the task comprises:

controlling, based on the configuration information of the bearer to be established by the at least one communication system, the at least one communication system to establish the bearer, to transmit via the bearer the communication service required by the task;

wherein the controlling the at least one communication system to establish the bearer comprises:

transmitting a bearer resource configuration message to the at least one communication system, and establishing the bearer by the at least one communication system based on the bearer resource configuration message; or transmitting a bearer establishment message to the at least one communication system, and autonomously determining resource configuration parameters and establishing the bearer by the at least one communication system.

5. The method according to claim 3, wherein the at least one communication system meets part or all of service quality requirements of the communication service.

6. The method according to claim 1, further comprising:

if the communication quality meets a preset condition, transmitting, via at least two communication systems respectively and based on a pre-specified resource allocation policy, the data segmented by the transmitting end, to enable the data transmitted by each communication system to be completely identical, partially identical, or completely different from each other;

wherein a receiving end of the each communication service receives a corresponding data packet via one or more communication systems corresponding to the each communication service, and determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or retransmits the incorrect data.

7. The method according to claim 1, wherein a receiving end of the each communication service receives a corresponding data packet via one or more communication systems corresponding to the each communication service, and determines the data packets received correctly and the data packets received incorrectly, and orders and recombines the data packets received correctly and the data packets received incorrectly; and if there is still incorrect data in the recombined data, the receiving end discards the incorrect data, or performs an error correction, or retransmits the incorrect data.

8. The method according to claim 7, wherein the data packets received incorrectly are detected by a corresponding communication system, and the communication system notifies the data packets to the receiving end or does not notify the data packets to the receiving end; or the data packets received incorrectly are determined by being verified by the receiving end;

or, the data packets received incorrectly are detected by a corresponding communication system, and the communication system forwards the data packets to the receiving end or does not forward the data packets to the receiving end.

9. A communication device, comprising: a processor, a memory, and a computer program stored in the memory and capable of being executed by the processor, wherein the computer program is executed by the processor to:

establish a scenario and determine a task of the scenario, wherein a plurality of communication systems exist in the scenario, and the task is completed via at least one communication service;

select at least one communication system for the task from the plurality of communication systems; and control the at least one communication system to transmit the communication service required by the task;

wherein the task comprises a communication task, a command task, or a control task; and the plurality of communication systems are selected for part or all of the communication services of the at least one communication service, and the communication services corresponding to the plurality of communication systems are transmitted by the plurality of communication systems cooperatively;

wherein the communication system selected for each communication service does not include a communication system that initiates the each communication service; or the communication system selected for each communication service comprises a communication system that initiates the each communication service and at least one communication system other than the communication system that initiates the each communication service;

or, a transmitting end of each communication service segments generated data to obtain data packets to be transmitted in one or more communication systems corresponding to the each communication service, the transmitting end numbers the data packets, and then the numbered data packets are transmitted via one or more communication systems corresponding to the each communication service, wherein the segmented data comprises encoded data or uncoded data.

10. The device according to claim 9, wherein the computer program is executed by the processor to establish the scenario by using attribute information and scenario information acquired, determine the task of the scenario, and configure a scenario tag for a communication device and/or a user account in the scenario, wherein the attribute information comprises attribute information of the communication device and/or attribute information of a communication network, and the scenario information comprises at least one of resource information, environmental information and user account information of the communication system.

11. The device according to claim 9, wherein the computer program is executed by the processor to select at least one communication system for the task from the plurality of communication systems based on a requirement of the task, scenario information of the scenario and a pre-specified resource allocation policy, and determine configuration information of a bearer to be established by each of the communication systems of the at least one communication system, wherein the configuration information comprises at least one of a service quality, a security parameter, and a channel resource parameter.

12. The device according to claim 11, wherein the computer program is executed by the processor to control, based on the configuration information of the bearer to be established by the at least one communication system, the at least one communication system to establish the bearer, to transmit via the bearer the communication service required by the task;
   wherein the computer program is executed by the processor to, based on configuration information of the bearer to be established by the selected communication system, transmit a bearer resource configuration message to the at least one communication system, wherein the at least one communication system establishes the bearer based on the bearer resource configuration message, and the communication service required by the task is transmitted by the established bearer; or
   the computer program is executed by the processor to, based on configuration information of the bearer to be established by the selected communication system, transmit a bearer establishment message to the at least one communication system, wherein the at least one communication autonomously determines resource configuration parameters and establishes the bearer, and the communication service required by the task is transmitted by the established bearer.

13. The device according to claim 11, wherein the at least one communication system meets part or all of service quality requirements of the communication service.

14. The device according to claim 9, wherein the computer program is executed by the processor to:
   if the communication quality meets a preset condition, transmit, via at least two communication systems respectively and based on a pre-specified resource allocation policy, the data segmented by the transmitting end, to enable the data transmitted by each communication system to be completely identical, partially identical, or completely different from each other;
   wherein a receiving end of the each communication service receives a corresponding data packet via one or more communication systems corresponding to the each communication service, and determines data packets received correctly and data packets received incorrectly, and orders, merges and recombines the data packets received correctly and the data packets received incorrectly; and if there is still incorrect data in the merged and recombined data, the receiving end discards the incorrect data, or performs an error correction, or retransmits the incorrect data.

15. The device according to claim 9, wherein a receiving end of the each communication service receives a corresponding data packet via one or more communication systems corresponding to the each communication service, and determines the data packets received correctly and the data packets received incorrectly, and orders and recombines the data packets received correctly and the data packets received incorrectly; and if there is still incorrect data in the recombined data, the receiving end discards the incorrect data, or performs an error correction, or retransmits the incorrect data.

16. The device according to claim 15, wherein the data packets received incorrectly are detected by a corresponding communication system, and the communication system notifies the data packets to the receiving end or does not notify the data packets to the receiving end; or
   the data packets received incorrectly are determined by being verified by the receiving end;
   or,
   the data packets received incorrectly are detected by a corresponding communication system, and the communication system forwards the data packets to the receiving end or does not forward the data packets to the receiving end.

* * * * *